(12) United States Patent
Liang et al.

(10) Patent No.: US 10,153,814 B1
(45) Date of Patent: Dec. 11, 2018

(54) MASSIVE MULTIPLE-INPUT MULTIPLE-OUTPUT (M-MIMO) WIRELESS DISTRIBUTION SYSTEM (WDS) AND RELATED METHODS FOR OPTIMIZING THE M-MIMO WDS

(71) Applicant: Corning Incorporated, Corning, NY (US)

(72) Inventors: Xiaojun Liang, Painted Post, NY (US); Anthony Ng'Oma, Horseheads, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 15/621,177

(22) Filed: Jun. 13, 2017

(51) Int. Cl.
| | |
|---|---|
| H04B 10/00 | (2013.01) |
| H04B 7/0413 | (2017.01) |
| H04B 7/06 | (2006.01) |
| H04B 7/024 | (2017.01) |
| H04B 7/02 | (2018.01) |

(52) U.S. Cl.
CPC .......... H04B 7/0413 (2013.01); H04B 7/024 (2013.01); H04B 7/0682 (2013.01); H04B 7/02 (2013.01)

(58) Field of Classification Search
USPC .................................................. 398/115–118
See application file for complete search history.

(56) References Cited

U.S. PATENT DOCUMENTS

| | | | | |
|---|---|---|---|---|
| 5,668,562 | A  * | 9/1997 | Cutrer | G01R 29/10 342/165 |
| 8,831,428 | B2 * | 9/2014 | Kobyakov | H04B 10/25753 398/115 |
| 2002/0114038 | A1* | 8/2002 | Arnon | H04B 10/1125 398/115 |

(Continued)

FOREIGN PATENT DOCUMENTS

| | | |
|---|---|---|
| WO | 2016115545 A1 | 7/2016 |
| WO | 2016115546 A1 | 7/2016 |

OTHER PUBLICATIONS

Ngo, Hien Quoc, et al. "Cell-free massive MIMO versus small cells." arXiv preprint arXiv:1602.06232 (2016), 17 pages.

(Continued)

Primary Examiner — Agustin Bello
(74) Attorney, Agent, or Firm — C. Keith Montgomery

(57) ABSTRACT

Embodiments of the disclosure relate to a massive multiple-input multiple-output (M-MIMO) wireless distribution system (WDS) and related methods for optimizing the M-MIMO WDS. In one aspect, the M-MIMO WDS includes a plurality of remote units each deployed at a location and includes one or more antennas to serve a remote coverage area. At least one remote unit can have a different number of the antennas from at least one other remote unit in the M-MIMO WDS. In another aspect, a selected system configuration including the location and number of the antennas associated with each of the remote units can be determined using an iterative algorithm that maximizes a selected system performance indicator of the M-MIMO WDS. As such, (Continued)

it may be possible to optimize the selected system performance indicator at reduced complexity and costs, thus helping to enhance user experiences in the M-MIMO WDS.

14 Claims, 9 Drawing Sheets

(56) References Cited

U.S. PATENT DOCUMENTS

| | | | |
|---|---|---|---|
| 2006/0268738 A1* | 11/2006 | Goerke | H04B 7/18539 370/254 |
| 2007/0054682 A1* | 3/2007 | Fanning | H04B 1/7176 455/509 |
| 2008/0002652 A1* | 1/2008 | Gupta | H01Q 1/2291 370/338 |
| 2011/0222415 A1* | 9/2011 | Ramamurthi | H04L 1/0003 370/252 |
| 2011/0222619 A1* | 9/2011 | Ramamurthi | H04L 27/0008 375/267 |
| 2015/0326286 A1 | 11/2015 | Wong et al. | |
| 2016/0294636 A1 | 10/2016 | Kalika et al. | |
| 2017/0026093 A1 | 1/2017 | Kim et al. | |

OTHER PUBLICATIONS

Panzner, Berthold, et al. "Deployment and implementation strategies for massive MIMO in 5G." 2014 IEEE Globecom Workshops (GC Wkshps). IEEE, 2014, 6 pages.

Truong, Kien T. and Robert W. Heath. "The viability of distributed antennas for massive MIMO systems." Asilomar Conference on Signals, Systems and Computers. IEEE, 2013, 6 pages.

Torkildson, Eric, et al. "Nonuniform array design for robust millimeter-wave MIMO links." Global Telecommunications Conference, GLOBECOM IEEE, 2009, 7 pages.

Oliveri, Giacomo, et al. "Synthesis of nonuniform MIMO arrays through combinatorial sets." IEEE Antennas and Wireless Propagation Letters 11 (2012): pp. 728-731.

International Search Report and Written Opinion PCT/US2018/036653 dated Sep. 18, 2018, 15 Pgs.

* cited by examiner

MASSIVE MULTIPLE-INPUT MULTIPLE-OUTPUT (M-MIMO) WIRELESS DISTRIBUTION SYSTEM (WDS) AND RELATED METHODS FOR OPTIMIZING THE M-MIMO WDS

BACKGROUND

The disclosure relates generally to optimizing performance of a wireless distribution system (WDS), and more particularly to enhancing WDS system capacity by reducing radio frequency (RF) interference among multiple users and among multiple antenna.

Wireless customers are increasingly demanding digital data services, such as streaming video signals. At the same time, some wireless customers use their wireless communications devices in areas that are poorly serviced by conventional cellular networks, such as inside certain buildings or areas where there is little cellular coverage. One response to the intersection of these two concerns has been the use of DASs. DASs include remote units configured to receive and transmit communications signals to client devices within an antenna range of the remote units. DASs can be particularly useful when deployed inside buildings or other indoor environments where the wireless communications devices may not otherwise be able to effectively receive RF signals from a source.

In this regard, FIG. 1 illustrates a distribution of communications services to remote coverage areas 100(1)-100(N) of a WDS provided in the form of a DAS 102, wherein 'N' is the number of remote coverage areas. These communications services can include cellular services, wireless services, such as RF identification (RFID) tracking, Wireless Fidelity (Wi-Fi), local area network (LAN), and wireless LAN (WLAN), wireless solutions (Bluetooth, Wi-Fi Global Positioning System (GPS), signal-based, and others) for location-based services, and combinations thereof, as examples. The remote coverage areas 100(1)-100(N) may be remotely located. In this regard, the remote coverage areas 100(1)-100(N) are created by and centered on remote units 104(1)-104(N) connected to a central unit 106 (e.g., a head-end equipment, a head-end controller, or a head-end unit). The central unit 106 may be communicatively coupled to a signal source 108, for example, a base transceiver station (BTS) or a baseband unit (BBU). In this regard, the central unit 106 receives downlink communications signals 110D from the signal source 108 to be distributed to the remote units 104(1)-104(N). The remote units 104(1)-104(N) are configured to receive the downlink communications signals 110D from the central unit 106 over a communications medium 112 to be distributed to the respective remote coverage areas 100(1)-100(N) of the remote units 104(1)-104(N). Each of the remote units 104(1)-104(N) may include an RF transmitter/receiver and at least one respective antenna 114(1)-114(N) operably connected to the RF transmitter/receiver to wirelessly distribute the communications services to client devices 116 within the respective remote coverage areas 100(1)-100(N). The remote units 104(1)-104(N) are also configured to receive uplink communications signals 110U from the client devices 116 in the respective remote coverage areas 100(1)-100(N) to be distributed to the signal source 108. The size of each of the remote coverage areas 100(1)-100(N) is determined by the amount of RF power transmitted by the respective remote units 104(1)-104(N), receiver sensitivity, antenna gain, and RF environment, as well as by RF transmitter/receiver sensitivity of the client devices 116. The client devices 116 usually have a fixed maximum RF receiver sensitivity, so that the above-mentioned properties of the remote units 104(1)-104(N) mainly determine the size of the respective remote coverage areas 100(1)-100(N).

The client devices 116 in any of the remote coverage areas 100(1)-100(N) may be running bandwidth-hungry applications, such as high-definition (HD) mobile video, virtual reality (VR), and augmented reality (AR), that drive the demand for high-capacity wireless access. Moreover, multiple client devices 116 may be running such bandwidth-hungry applications concurrently, thus further increasing the demand for data throughput in each of the remote coverage areas 100(1)-100(N). As a result, the wireless communications industry has adopted multiple-input multiple-output (MIMO) technology to help meet the increasing bandwidth demand by the client devices 116. In this regard, each of the remote units 104(1)-104(N) may employ multiple antennas to distribute multiple streams of the downlink communications signals 110D concurrently. For example, each of the remote units 104(1)-104(N) may employ two antennas to concurrently transmit two streams of the downlink communications signals 110D, thus doubling the data throughput in the remote coverage areas 100(1)-100(N). When the remote units 104(1)-104(N) distribute the multiple streams of the downlink communications signals 110D concurrently to multiple client devices 116, the remote units 104(1)-104(N) are said to be communicating the downlink communications signals 110D based on multiuser MIMO (MU-MIMO) technology.

The MU-MIMO technology can help provide increased data rate/throughput, enhanced reliability, improved energy efficiency, and/or reduced interference in the remote coverage areas 100(1)-100(N). As such, the MU-MIMO technology has been incorporated into recent and evolving wireless communications standards, such as long-term evolution (LTE) and LTE-Advanced. However, to fully benefit from the enhancements provided by the MU-MIMO technology, each of the multiple client devices 116 needs to employ an equal number of antennas as the remote units 104(1)-104(N). Unfortunately, it may become more difficult to add additional antennas in the client devices 116 due to space limitations and complexity. As a result, it may become difficult to scale the MU-MIMO technology beyond the capabilities of the client device 116. Accordingly, the wireless communications industry is adopting a new antenna technology known as massive MIMO (M-MIMO), which may scale up the MU-MIMO technology by orders of magnitude, to meet the increasing bandwidth demands by the client devices 116.

No admission is made that any reference cited herein constitutes prior art. Applicant expressly reserves the right to challenge the accuracy and pertinency of any cited documents.

SUMMARY

Embodiments of the disclosure relate to a massive multiple-input multiple-output (M-MIMO) wireless distribution system (WDS) and related methods for optimizing the M-MIMO WDS. In one aspect, the M-MIMO WDS includes a plurality of remote units each deployed at a location and includes one or more antennas to serve a remote coverage area. In examples discussed herein, the location and a number of the antennas associated with each of the remote units are adapted to a non-uniform client device density distribution. As such, at least one remote unit can have a different number of the antennas from at least one other remote unit in the M-MIMO WDS. In another aspect, a selected system configuration including the location and the number of the antennas associated with each of the remote units can be determined using an iterative algorithm. The iterative algorithm utilizes a performance-estimation function to determine the selected system configuration that maximizes a selected system performance indicator (e.g., system capacity) of the M-MIMO WDS. By configuring the remote units based on the non-uniform client device density distribution and determining the selected system configuration using the iterative algorithm, it may be possible to optimize the selected system performance indicator at reduced complexity and costs, thus helping to enhance user experiences in the M-MIMO WDS.

In this regard, in one aspect, a M-MIMO WDS is provided. The M-MIMO WDS includes a plurality of remote units each configured to be deployed at a location to serve a respective remote coverage area. The M-MIMO WDS also includes a central unit communicatively coupled to each of the plurality of remote units over a communications link among a plurality of communications links. The central unit is configured to encode a received downlink communications signal to generate a downlink MIMO communications signal. The central unit is also configured to distribute the downlink MIMO communications signal over the plurality of communications links to the plurality of remote units. Each of the plurality of remote units comprises one or more antennas configured to distribute the downlink MIMO communications signal to at least one client device located in the respective remote coverage area. At least one remote unit among the plurality of remote units comprises a different number of antennas from at least one other remote unit among the plurality of remote units.

In another aspect, a method for optimizing a selected performance indication of a M-MIMO WDS is provided. The method includes generating an initial system configuration based on at least one initial system parameter of a M-MIMO WDS. The initial system configuration comprises a plurality of configuration parameter groups corresponding to a plurality of remote units in the M-MIMO WDS, respectively. The method also includes providing the plurality of configuration parameter groups to a performance-estimation function configured to estimate the selected system performance indicator of the M-MIMO WDS based on the plurality of configuration parameter groups. The method also includes generating an initial estimation of the selected system performance indicator by the performance-estimation function according to the initial system configuration. The method also includes updating one or more selected configuration parameter groups among the plurality of configuration parameter groups to generate at least one updated system configuration. The method also includes providing the plurality of configuration parameter groups comprising the one or more selected configuration parameter groups to the performance-estimation function. The method also includes generating at least one updated estimation of the selected system performance indicator by the performance-estimation function according to the at least one updated system configuration. The method also includes determining a selected system configuration between the initial system configuration and the at least one updated system configuration corresponding to a higher selected system performance indicator among the initial estimation of the selected system performance indicator and the at least one updated estimation of the selected system performance indicator. The method also includes configuring the plurality of remote units based on the selected system configuration.

In another aspect, non-transitory computer-readable medium including software with instructions is provided. The non-transitory computer-readable medium including software with instructions can generate an initial system configuration based on at least one initial system parameter of a M-MIMO WDS. The initial system configuration comprises a plurality of configuration parameter groups corresponding to a plurality of remote units in the M-MIMO WDS, respectively. The non-transitory computer-readable medium including software with instructions can also provide the plurality of configuration parameter groups to a performance-estimation function configured to estimate a selected system performance indicator of the M-MIMO WDS based on the plurality of configuration parameter groups. The non-transitory computer-readable medium including software with instructions can also generate an initial estimation of the selected system performance indicator by the performance-estimation function according to the initial system configuration. The non-transitory computer-readable medium including software with instructions can also update one or more selected configuration parameter groups among the plurality of configuration parameter groups to generate at least one updated system configuration. The non-transitory computer-readable medium including software with instructions can also provide the plurality of configuration parameter groups comprising the one or more selected configuration parameter groups to the performance-estimation function. The non-transitory computer-readable medium including software with instructions can also generate at least one updated estimation of the selected system performance indicator by the performance-estimation function according to the at least one updated system configuration. The non-transitory computer-readable medium including software with instructions can also determine a selected system configuration between the initial system configuration and the at least one updated system configuration corresponding to a higher selected system performance indicator among the initial estimation of the selected system performance indicator and the at least one updated estimation of the selected system performance indicator.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification. The drawings illustrate one or more embodiments, and together with the description serve to explain principles and operation of the various embodiments.

DETAILED DESCRIPTION

Embodiments of the disclosure relate to a massive multiple-input multiple-output (M-MIMO) wireless distribution system (WDS) and related methods for optimizing the M-MIMO WDS. In one aspect, the M-MIMO WDS includes a plurality of remote units each deployed at a location and includes one or more antennas to serve a remote coverage area. In examples discussed herein, the location and a number of the antennas associated with each of the remote units are adapted to a non-uniform client device density distribution. As such, at least one remote unit can have a different number of the antennas from at least one other remote unit in the M-MIMO WDS. In another aspect, a selected system configuration including the location and the number of the antennas associated with each of the remote units can be determined using an iterative algorithm. The iterative algorithm utilizes a performance-estimation function to determine the selected system configuration that maximizes a selected system performance indicator (e.g., system capacity) of the M-MIMO WDS. By configuring the remote units based on the non-uniform client device density distribution and determining the selected system configuration using the iterative algorithm, it may be possible to optimize the selected system performance indicator at reduced complexity and costs, thus helping to enhance user experiences in the M-MIMO WDS.

Figure 1:
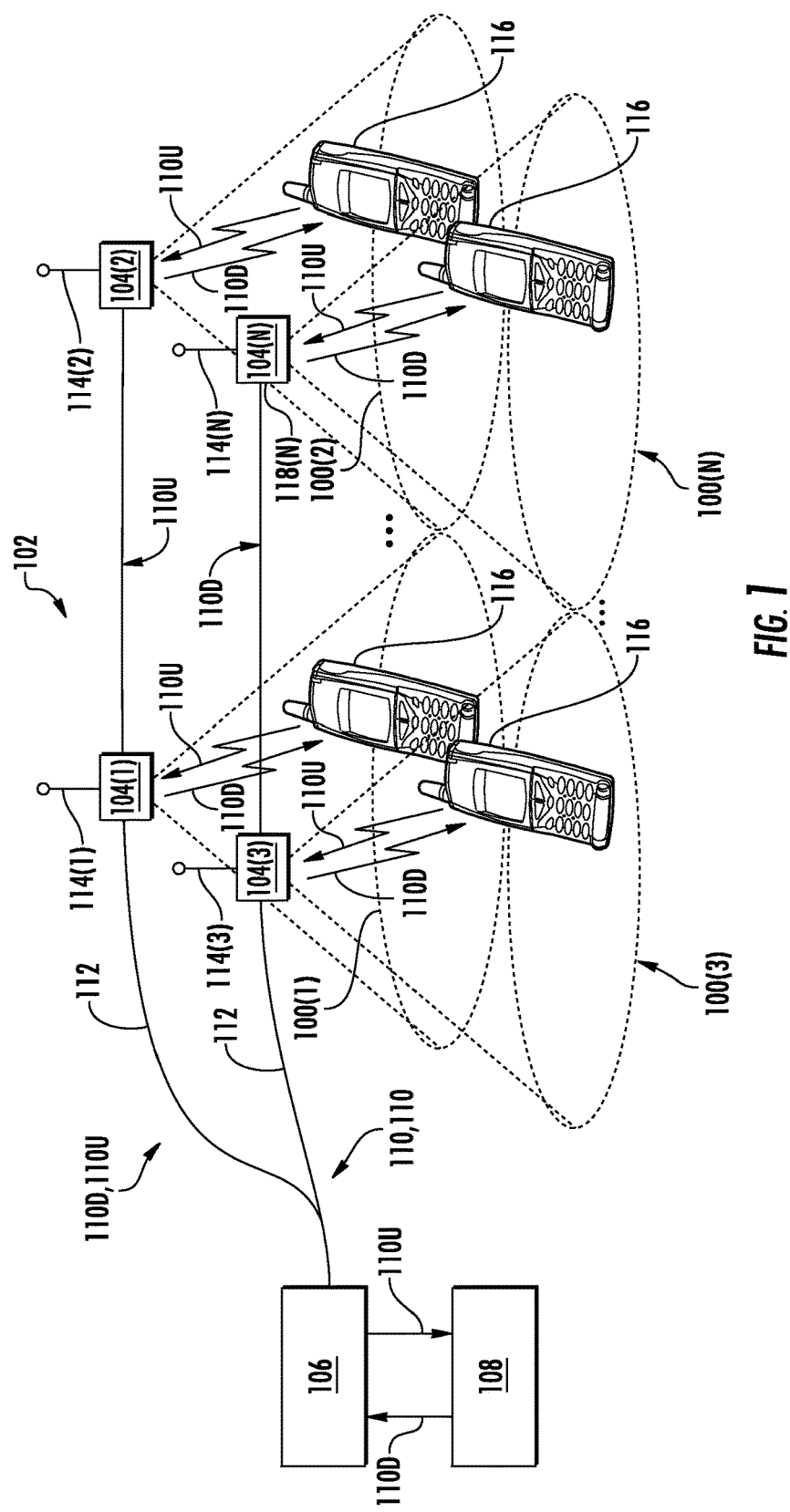
FIG. 1 is a schematic diagram of an exemplary wireless distribution system (WDS), which may be a distributed antenna system (DAS) for example.
Figure 2A:
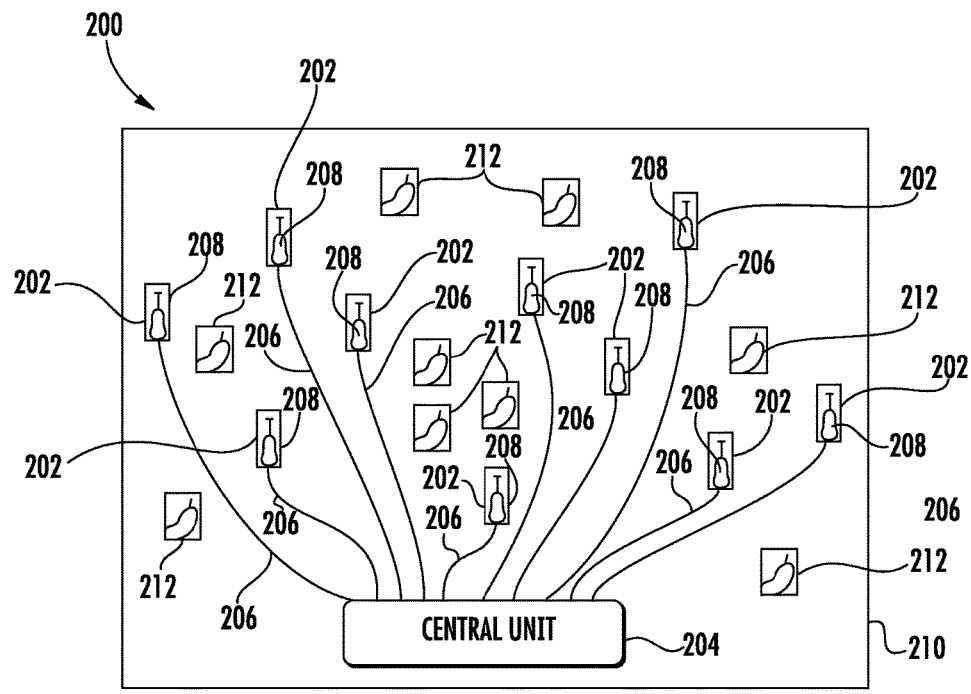
FIG. 2A is a schematic diagram of an exemplary conventional fully distributed (FD) massive multiple-input multiple-output (M-MIMO) (FD-M-MIMO) system.
Figure 2B:
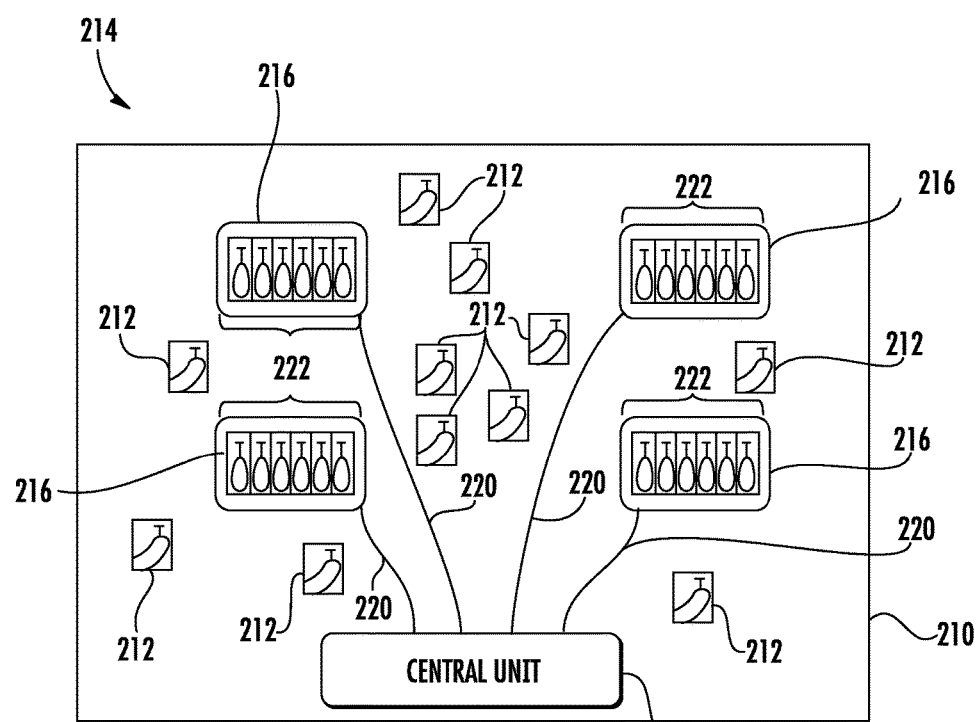
FIG. 2B is a schematic diagram of an exemplary conventional cluster distributed (CD) M-MIMO (CD-M-MIMO) system that can help reduce complexity and costs of the conventional FD-M-MIMO system of FIG. 2A.

Before discussing exemplary aspects of a M-MIMO WDS and related methods for optimizing performance of the M-MIMO WDS, a brief discussion on M-MIMO technology and conventional M-MIMO system topology are first provided with reference to FIGS. 2A-2B. The discussion of specific exemplary aspects of a M-MIMO WDS and related methods for optimizing performance of the M-MIMO WDS starts below with reference to FIG. 3.

M-MIMO is an emerging antenna technology developed by the wireless communications industry as one of the key enabling technologies for the upcoming fifth-generation (5G) wireless communications systems. In a M-MIMO-based communications system, one or more antenna arrays include hundreds or even thousands of antennas employed to simultaneously communicate with a large number of client devices, such as smart phones, laptops, etc., using the same radio frequency (RF) spectral resource. An M-MIMO antenna system relies on spatial multiplexing for communicating with the large number of client devices. By coherently pre-coding a wireless communications signal over the antenna array(s), it is possible to form and direct multiple RF beams toward multiple client devices simultaneously. Depending on an actual bandwidth requirement of a selected client device among the large number of client devices, an appropriate number of the antennas in the antenna array(s) may be used to form and transmit an RF beam towards the selected client device. The selected client device, on the other hand, does not need to employ a matching number of antennas for receiving the RF beam directed to it. In this regard, the M-MIMO antenna system can overcome the scalability limitations associated with existing multi-user MIMO (MU-MIMO) antenna systems, thus significantly improving spectral efficiency of the 5G wireless communications systems to provide increased capacity and enhanced user experiences.

The M-MIMO antenna system may be incorporated into a WDS to support 5G wireless communications in an indoor environment. However, deployment of co-located large-scale M-MIMO antenna systems in the indoor environment based on a centralized architecture presents several challenges, including the large antenna array form factor (at frequencies below 6 gigahertz (GHz)) and lower performance due to increased signal losses coming from building walls. As such, distributed M-MIMO antenna architectures become more preferable in the indoor environment due to cost and performance benefits over the centralized architecture.

In this regard, FIG. 2A is a schematic diagram of an exemplary conventional fully distributed (FD) M-MIMO (FD-M-MIMO) system 200. The conventional FD-M-MIMO system 200 includes a plurality of remote units 202 coupled to a central unit 204 via a plurality of communication links 206, respectively. The remote units 202 include a plurality of antennas 208, respectively. The remote units 202 may be geographically distributed within a coverage boundary of a wireless cell 210 based on a predefined user distribution profile. In this regard, the antennas 208 in the remote units 202 collectively form an M-MIMO antenna array for simultaneously distributing multiple data streams at the same RF frequency to multiple client devices 212 located within the coverage boundary of the wireless cell 210.

The conventional FD-M-MIMO system 200 can provide higher network capacity, since the antennas 208 can transmit the multiple data streams at the same RF frequency at the same time. However, since each of the remote units 202 is connected to the central unit 204 by a dedicated communication link 206, system complexity as well as hardware and installation costs of the conventional FD-M-MIMO system 200 may increase significantly. Thus, an alternative M-MIMO system architecture has been developed by the industry to help reduce the complexity and costs of the conventional FD-M-MIMO system 200.

In this regard, FIG. 2B is a schematic diagram of an exemplary conventional cluster distributed (CD) M-MIMO (CD-M-MIMO) system 214 that can help reduce the complexity and costs of the conventional FD-M-MIMO system 200 of FIG. 2A. Common elements between FIGS. 2A and 2B are shown therein with common element numbers and will not be re-described herein.

The conventional CD-M-MIMO system 214 includes a plurality of remote units 216 coupled to a central unit 218 via a plurality of communication links 220, respectively. The remote units 216 may be geographically distributed within the coverage boundary of the wireless cell 210 based on the predefined user distribution profile. The spatial distribution of the remote units 216 is designed such that good coverage of the wireless cell 210 is obtained. In contrast to the remote units 202 in the conventional FD-M-MIMO system 200 of FIG. 2A, each of the remote units 216 includes a plurality of antennas 222. A number of the antennas 222 included in each of the remote units 216 is configured to be the same. For example, as shown in FIG. 2B, each of the remote units 216 includes six antennas. Similar to the conventional FD-M-MIMO system 200 of FIG. 2A, the antennas 222 in each of the remote units 216 collectively form an M-MIMO antenna array for simultaneously distributing multiple data streams at the same RF frequency to the multiple client devices 212 located within the coverage boundary of the wireless cell 210. The conventional CD-M-MIMO system 214 has a lower system complexity and a smaller installation cost compared to the conventional FD-M-MIMO system 200 of FIG. 2A as the number of the remote units 216 and the communication links 220 are reduced.

As discussed above, the remote units 202 in the conventional FD-M-MIMO system 200 and the remote units 216 in the conventional CD-M-MIMO system 214 are geographically distributed within the coverage boundary of the wireless cell 210 based on the predefined user distribution profile. Often time, the predefined user distribution profile assumes uniform distribution of the multiple client devices 212 throughout the wireless cell 210. However, the multiple client devices 212 are more likely to be distributed non-uniformly in most indoor environments. For example, a UE density in a conference room can reach three persons per square-meter (3 persons/m²). In contrast, the UE density in a cubical area may be just 0.15 persons/m². Experiments have shown that the average UE density in a typical office building is approximately 0.05 persons/m². In this regard, the complexity of non-uniform UE distribution in the indoor environment necessitates advanced M-MIMO system architecture adapted to effectively utilize network infrastructure and RF spectral resources based on non-uniform distribution of the multiple client devices 212.

Figure 3:
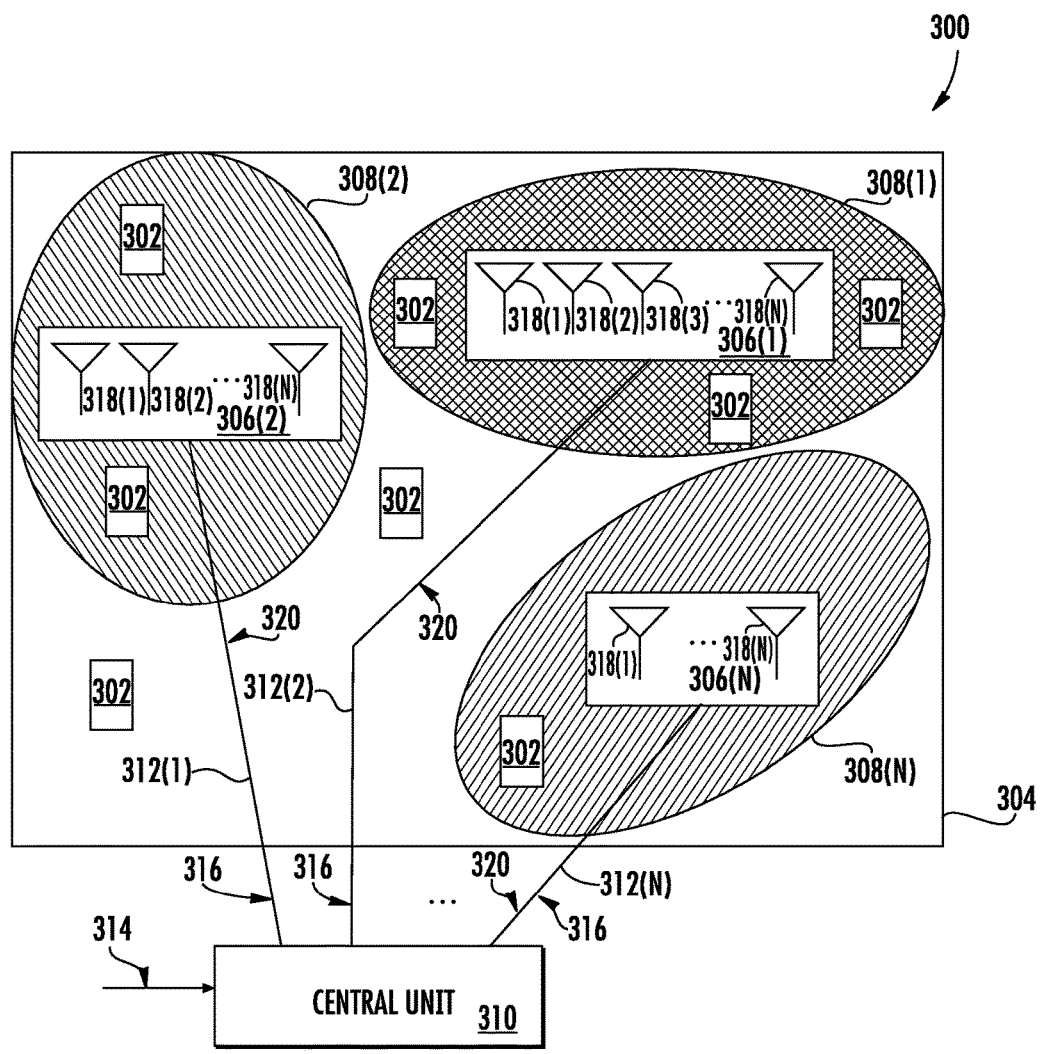
FIG. 3 is a schematic diagram of an exemplary M-MIMO WDS configured to support a plurality of client devices distributed non-uniformly throughout a coverage area of the M-MIMO WDS.

In this regard, FIG. 3 is a schematic diagram of an exemplary M-MIMO WDS 300 configured to support a plurality of client devices 302 distributed non-uniformly throughout a coverage area 304 of the M-MIMO WDS 300. As is further discussed below in FIG. 3, the M-MIMO WDS 300 differs from the conventional FD-M-MIMO system 200 of FIG. 2A and the conventional CD-M-MIMO system 214 of FIG. 2B in two aspects. First, the M-MIMO WDS 300 includes a plurality of remote units 306(1)-306(N) to which radio resources (e.g., antennas) are strategically allocated to maximize a selected system performance indicator (e.g., network capacity) based on a non-uniform client device density distribution. Second, geographic locations (e.g., location coordinates) of the remote units 306(1)-306(N) are determined according to the non-uniform client device density distribution and adapted to an indoor wireless signal propagation environment. In this regard, the M-MIMO WDS 300 is configured based on a non-uniform distributed (ND) M-MIMO (ND-M-MIMO) architecture. Further, as discussed later with reference to FIG. 4, an iterative algorithm employing a performance-related objective function can be utilized to determine radio resource allocations and geographic locations for the remote units 306(1)-306(N) in the M-MIMO WDS 300.

The M-MIMO WDS 300 configured based on the ND-M-MIMO architecture is advantageous over the conventional FD-M-MIMO system 200 of FIG. 2A and the conventional CD-M-MIMO system 214 of FIG. 2B in a variety of aspects. First, the M-MIMO WDS 300 can be implemented with a significant reduction in network infrastructure and installation cost. Second, the M-MIMO WDS 300 can significantly improve network capacity at minimal cost. Third, the M-MIMO WDS 300 provides greater architectural flexibility and scalability, thus making it possible to adapt the M-MIMO WDS 300 to support future wireless technologies (e.g. 5G technology) at minimal cost. For example, given that the M-MIMO WDS 300 is agnostic to operating RF carrier frequency, the M-MIMO WDS 300 can be adapted to support millimeter-wave 5G networks at minimal cost. In addition, it may be possible to further increase system capacity and/or reliability of the M-MIMO WDS 300 by adding more antennas to the remote units 306(1)-306(N). Furthermore, the M-MIMO WDS 300 can support all forms of base station functional splits and is also agnostic to front-haul and mid-haul transmission technologies (e.g., fiber optical-based transmission technology).

With continuing reference to FIG. 3, the remote units 306(1)-306(N) are configured to be deployed at a plurality of locations $(x_1,y_1)$-$(x_N,y_N)$ to serve a plurality of remote coverage areas 308(1)-308(N), respectively. The respective location for each of the remote units 306(1)-306(N) is represented by a pair of coordinates $(x_i,y_i)$ (1≤i≤N). In a non-limiting example, the pair of coordinates $(x_i,y_i)$ can correspond to a pair of longitude-latitude coordinates as determined by such system as the Global Positioning System (GPS). In another non-limiting example, the pair of coordinates $(x_i,y_i)$ can be represented by a pair of Cartesian coordinates that are arbitrarily determined based on a layout map of the coverage area 304. It should be appreciated other coordinate systems (e.g., Polar coordinate system) may also be used to represent the pair of coordinates $(x_i,y_i)$ for each of the remote units 306(1)-306(N).

The M-MIMO WDS 300 includes a central unit 310 communicatively coupled to the remote units 306(1)-306(N) over a plurality of communications links 312(1)-312(N), respectively. The communications links 312(1)-312(N) may be fiber optical-based communications links or any other type of communications links. The central unit 310 is configured to encode a received downlink communications signal 314 to generate a downlink MIMO communications signal 316 and provide the downlink MIMO communications signal 316 to the remote units 306(1)-306(N) over the communications links 312(1)-312(N). The central unit 310 may employ a baseband unit to process (e.g., pre-code) the downlink MIMO communications signal 316 prior to distributing the downlink MIMO communications signal 316 to the remote units 306(1)-306(N). In this regard, the remote units 306(1)-306(N) in the M-MIMO WDS 300 are configured to simultaneously transmit the downlink MIMO communications signal 316 in the same RF spectrum (e.g., channel or band).

Each of the remote units 306(1)-306(N) includes one or more antennas 318(1)-318(M) configured to distribute the downlink MIMO communications signal 316 to at least one of the client devices 302 located in a respective coverage area among the remote coverage areas 308(1)-308(N). In a non-limiting example, a remote unit located in any of the remote coverage areas 308(1)-308(N) can transmit the downlink MIMO communications signal 316 concurrently from a subset of the antennas 318(1)-318(M) (e.g., two, three, or four) to a respective client device among the client devices 302 if the respective client device is equipped with an equal number (e.g., two, three, or four) of antennas. In this regard, the remote unit is transmitting the downlink MIMO communications signal 316 via MIMO. Alternatively, the remote unit located in any of the remote coverage areas 308(1)-308(N) can utilize the subset of the antennas 318(1)-318(M) (e.g., two, three, or four) to form an RF beam for distributing the downlink MIMO communications signal 316 to the respective client device among the client devices 302 if the respective client device is not equipped with an equal number of antennas. In this regard, the remote unit is transmitting the downlink MIMO communications signal 316 via RF beamforming. By transmitting the downlink MIMO communications signal 316 using MIMO and/or RF beamforming, the remote units 306(1)-306(N) in the M-MIMO WDS 300 can adapt flexibly to the receiving capabilities of the client devices 302. As a result, the client devices 302 may be able to receive the downlink MIMO communications signal 316 in any of the remote coverage areas 308(1)-308(N) with a desired RF signal quality (e.g., signal-to-noise ratio (SNR)) and data throughput.

In addition to distributing the downlink MIMO communications signal 316 to the client devices 302, each of the remote units 306(1)-306(N) is configured to receive at least one uplink communications signal 320 from at least one of the client devices 302 and provide the received uplink communications signal 320 to the central unit 310 over a respective communications link among the communications links 312(1)-312(N). The central unit 310 may combine the uplink communications signal 320 received from the remote units 306(1)-306(N) and/or perform additional signal processing (e.g., filtering, frequency conversion, and signal conversion).

As mentioned earlier, the M-MIMO WDS 300 is configured based on the ND-M-MIMO architecture adapted to the non-uniform client device density distribution throughout the coverage area 304. In a non-limiting example, remote coverage area 308(1) (e.g., a conference room) has a higher client device density than remote coverage area 308(2) (e.g., a hallway). In the same non-limiting example, the remote coverage area 308(2) has a higher client device density than remote coverage area 308(N) (e.g., a cubical area). Accordingly, the demand for data throughput in the remote coverage area 308(1) would be higher than that in the remote coverage area 308(2). Similarly, the demand for data throughput in the remote coverage area 308(2) would be higher than that in the remote coverage area 308(N). In this regard, to optimize user experience in the M-MIMO WDS 300, it may be necessary to maximize system capacity of the M-MIMO WDS 300 throughout the coverage area 304. In examples discussed hereinafter, the system capacity of the M-MIMO WDS 300 refers to an aggregated data throughput in the remote coverage areas 308(1)-308(N).

In one aspect, the locations $(x_1,y_1)$-$(x_N,y_N)$ of the remote units 306(1)-306(N) are strategically determined based on the client device density distribution throughout the coverage area 304. For example, the location $(x_1,y_1)$ of remote unit 306(1) can correspond to a center point of the remote coverage are 308(1). In another aspect, given that the remote coverage area 308(1) has a higher client device density than the remote coverage area 308(2), the remote unit 306(1) can be configured to include more antennas than remote unit 306(2). Likewise, since the remote coverage area 308(2) has a higher client device density than the remote coverage area 308(N), the remote unit 306(2) can be configured to include more antennas than remote unit 306(N). In this regard, given the non-uniform client device density distribution in the coverage area 304, at least one remote among the remote units 306(1)-306(N) (e.g., the remote unit 306(1)) is configured to include a different number of antennas from at least one other remote unit among the remote units 306(1)-306(N) (e.g., the remote unit 306(2)). By strategically determining the locations $(x_1,y_1)$-$(x_N,y_N)$ of the remote units 306(1)-306(N) and allocating a respective number of the antennas 318(1)-318(N) to each of the remote units 306(1)-306(N) based on the non-uniform client device density distribution, it may be possible to maximize the system capacity of the M-MIMO WDS 300 at reduced complexity and cost, while preserving flexibility and scalability for supporting future RF spectrums and/or communications technologies.

The locations $(x_1,y_1)$-$(x_N,y_N)$ of the remote units 306(1)-306(N) and the respective number of the antennas 318(1)-318(N) allocated to each of the remote units 306(1)-306(N) can be determined systematically based on a process. In this regard, FIG. 4 is a flowchart illustrating an exemplary process 400 for optimizing a selected performance indicator of the M-MIMO WDS 300 of FIG. 3 based on the non-uniform client device density distribution.

Figure 4:
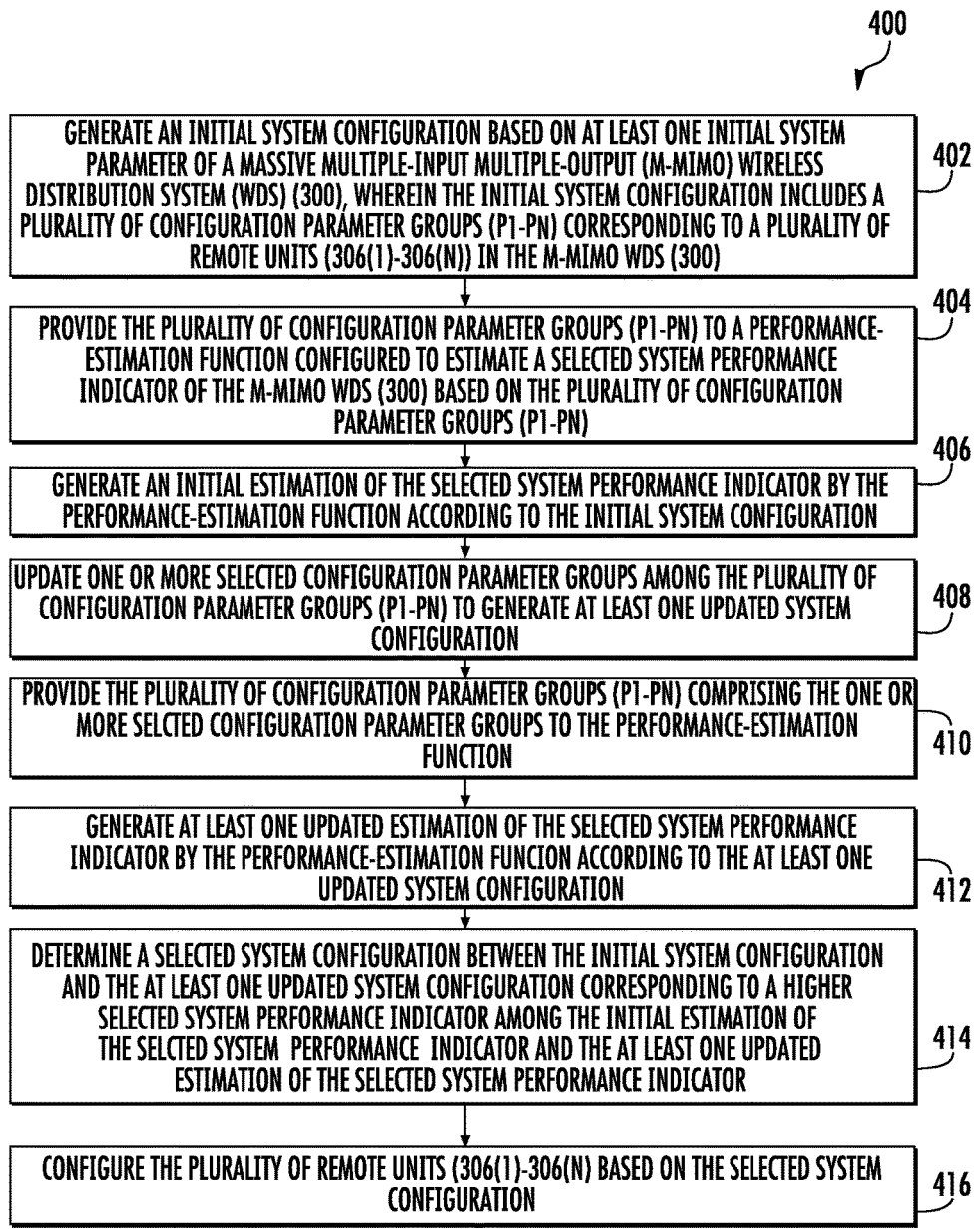
FIG. 4 is a flowchart illustrating an exemplary process for optimizing a selected performance indicator of the M-MIMO WDS of FIG. 3 based on a non-uniform client device density distribution.

With reference to FIG. 4, the process 400 includes generating an initial system configuration based on at least one initial system parameter of the M-MIMO WDS 300 (block 402). The initial system configuration includes a plurality of configuration parameter groups $P_1$-$P_N$ corresponding to the remote units 306(1)-306(N), respectively. In a non-limiting example, a configuration parameter group Pi ($1 \leq i \leq N$) among the configuration parameter groups $P_1$-$P_N$ includes configuration parameters $(x_i, y_i, n_i)$ ($1 \leq i \leq N$). Among the configuration parameters, $(x_i, y_i)$ represents respective location coordinates of a remote unit 306($i$) and $n_i$ represents a respective number of antennas provided in the remote unit 306($i$) ($1 \leq i \leq N$). Accordingly, the configuration parameter groups $P_1$-$P_N$ may be expressed as $(x_1, y_1, n_1)$-$(x_N, y_N, n_N)$ for the remote units 306(1)-306(N), respectively. In another non-limiting example, the initial system parameter used to generate the initial system configuration includes such parameters of the M-MIMO WDS 300 as total number of antennas, total number of remote units, system layout, client device density distribution, and/or coverage area RF survey.

Next, the configuration parameter groups $P_1$-$P_N$ are provided to a performance-estimation function $f(P_1$-$P_N)$, which is configured to estimate the selected system performance indicator of the M-MIMO WDS 300 based on the configuration parameter groups $P_1$-$P_N$ (block 404). The performance-estimation function $f(P_1$-$P_N)$, which may be implemented by a computing device (e.g., a personal computer, a laptop, etc.) based on software instructions stored in a non-transitory computer-readable medium, will be further discussed later with reference to FIG. 5. The performance-estimation function $f(P_1$-$P_N)$ generates an initial estimation of the selected system performance indicator according to the initial system configuration (block 406).

Subsequently, one or more selected configuration parameter groups among the configuration parameter groups $P_1$-$P_N$ are updated to generate at least one updated system configuration (block 408). As will be further discussed later with reference to FIG. 5, the selected configuration parameter groups among the configuration parameter groups $P_1$-$P_N$ may be changed based on predetermined iteration steps. The configuration parameter groups $P_1$-$P_N$, which now include the updated selected configuration parameter groups, are provided to the performance-estimation function $f$ ($P_1$-$P_N$) (block 410) The performance-estimation function $f$ ($P_1$-$P_N$) generates at least one updated estimation of the selected system performance indicator according to the updated system configuration (block 412).

Next, a selected system configuration between the initial system configuration and the updated system configuration can be determined (block 414). The selected system configuration corresponds to a higher selected system performance indicator between the initial estimation of the selected system performance indicator and the updated estimation of the selected system performance indicator determined by the performance-estimation function $f$ ($P_1$-$P_N$). Then, it is possible to configure the remote units 306(1)-306(N) based on the selected system configuration, thus maximizing the selected system performance indicator in the M-MIMO WDS 300 (block 416). The selected system configuration may be output to, for example a printer, a computer monitor, a storage media, etc., prior to configuring the remote units 306(1)-306(N) in the M-MIMO WDS 300.

In a non-limiting example, the selected system performance indicator refers to the system capacity of the M-MIMO WDS 300. In this regard, the process 400 can be utilized to optimize the system capacity of the M-MIMO WDS 300. Accordingly, in block 404, the configuration parameter groups $P_1$-$P_N$ are provided to the performance-estimation function $f$ ($P_1$-$P_N$), which is configured to estimate the system capacity of the M-MIMO WDS 300 based on the configuration parameter groups $P_1$-$P_N$. In block 406, the performance-estimation function $f$ ($P_1$-$P_N$) generates an initial system capacity according to the initial system configuration. In block 408, one or more selected configuration parameter groups among the configuration parameter groups $P_1$-$P_N$ are updated to generate at least one updated system configuration. In block 410, the configuration parameter groups $P_1$-$P_N$, which now include the updated selected configuration parameter groups, are provided to the performance-estimation function $f$ ($P_1$-$P_N$). In block 412, the performance-estimation function $f$ ($P_1$-$P_N$) generates at least one updated system capacity according to the updated system configuration. In block 414, the selected system configuration between the initial system configuration and the updated system configuration can be determined. The selected system configuration corresponds to a higher system capacity between the initial system capacity and the updated system capacity determined by the performance-estimation function $f$ ($P_1$-$P_N$). In block 416, the remote units 306(1)-306(N) are configured based on the selected system configuration to maximize the system capacity in the M-MIMO WDS 300.

Figure 5:
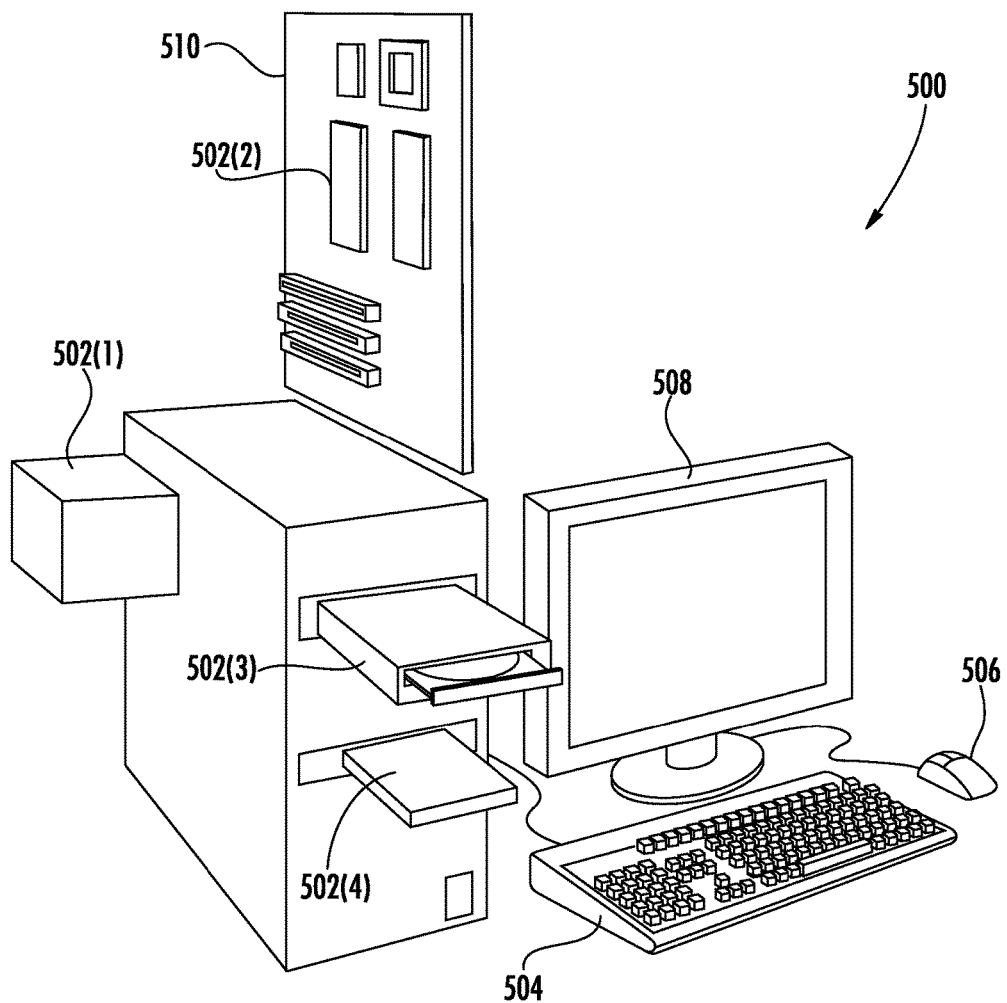
FIG. 5 is a schematic diagram of an exemplary computer system including one or more non-transitory computer-readable media for storing software instructions to implement a performance-estimation function for optimizing the selected performance indicator of FIG. 4.

As mentioned earlier, a computing device (e.g., a personal computer, a laptop, etc.) may implement the performance-estimation function $f$ ($P_1$-$P_N$) based on software instructions stored in a non-transitory computer-readable medium. In this regard, FIG. 5 is a schematic diagram of an exemplary computer system 500 including one or more non-transitory computer-readable media 502(1)-502(4) for storing software instructions to implement the performance-estimation function $f$ ($P_1$-$P_N$) of FIG. 4. Common elements between FIGS. 3, 4, and 5 are shown therein with common element numbers and will not be re-described herein.

With reference to FIG. 5, the non-transitory computer-readable media 502(1)-502(4) further include a hard drive 502(1), an on-board memory system 502(2), a compact disc 502(3), and a floppy disk 502(4). Each of the non-transitory computer-readable media 502(1)-502(4) may be configured to store the software instructions to implement the performance-estimation function $f$ ($P_1$-$P_N$). The computer system 500 also includes a keyboard 504 and a computer mouse 506 for inputting the software instructions onto the non-transitory computer-readable media 502(1)-502(4). The keyboard 504 and the computer mouse 506 may also be used to input the initial system parameter of the M-MIMO WDS 300, which can be used to generate the initial system configuration in block 402 of FIG. 4. The computer system 500 also includes a monitor 508 for outputting the selected system configuration for configuring the remote units 306(1)-306(N). Further, the computer system 500 includes a processor 510 configured to read the software instructions from the non-transitory computer-readable media 502(1)-502(4) and execute the software instructions to implement the performance-estimation function $f$ ($P_1$-$P_N$). While the computer system 500 is illustrated as a single device, the computer system 500 may also be a computer network deployed according to a centralized topology or a distributed topology.

When the process 400 of FIG. 4 is utilized to optimize the system capacity of the M-MIMO WDS 300, the performance-estimation function $f$ ($P_1$-$P_N$) can be used to calculate an average data rate of a client device over the coverage area 304 for a given configuration parameter group of the configuration parameter groups $P_1$-$P_N$. The performance-estimation function $f$ ($P_1$-$P_N$) is a function of the configuration parameter groups $P_1$-$P_N$ and can be expressed as equation Eq. 1 below.

$$f(P_1 - P_N) = \frac{B}{\iint W(x, y) dx dy} \iint \log_2\left[1 + \left(\frac{\lambda}{4\pi}\right)^r \frac{P_s}{P_n} \sum_{k=1}^{N} \frac{n_k^q}{d_k^r(x, y, x_k, y_k)}\right] W(x, y) dx dy \quad \text{(Eq. 1)}$$

In the equation Eq. 1 above, B represents a channel bandwidth of the downlink MIMO communications signal 316 to be distributed by the remote units 306(1)-306(N) in the coverage area 304. For example, the channel bandwidth of the downlink MIMO communications signal 316 can be 20 megahertz (MHz) in such wireless communications systems as long-term evolution (LTE). W(x,y) is a weighting function representing such spatially-dependent parameters as system layout information, client device density distribution, and signal propagation environment at selected locations in the coverage area 304 of the M-MIMO WDS 300. According to the non-limiting example discussed earlier with reference to FIG. 3, the remote coverage area 308(1) (e.g., a conference room) has a higher client device density than the remote coverage area 308(2) (e.g., a hallway), and the remote coverage area 308(2) has a higher client device density than the remote coverage area 308(N) (e.g., a cubical area). In this regard, the remote coverage area 308(1) would be assigned a higher weighting factor than the remote coverage area 308(2), and the remote coverage area 308(2) would be assigned a higher weighting factor that the remote coverage area 308(N). Accordingly, the remote coverage area 308(1) would correspond to a higher weight than the remote coverage area 308(2) in the weighting function W(x,y) and the remote coverage area 308(2) would correspond to a higher weight than the remote coverage area 308(N) in the weighting function W(x,y). In this regard, the performance-estimation function $f$ ($P_1$-$P_N$) is proportionally related to the weighting function W(x,y). The double integration $\iint$ W(x, y)dxdy represents a normalized weighting function (e.g., total weight) throughout the coverage area 304.

With continuing reference to the equation Eq. 1, $P_s$ and $P_n$ represent signal power and noise power in the coverage area 304, respectively. $d_k^r$(x, y, $x_k$, $y_k$) represents a distance between the location ($x_k$, $y_k$) of the remote unit 306(K) (1≤k≤N) and a selected location (x,y) in the coverage area 304. r represents an exponential of a free-space propagation attenuation model. $n_k^q$ represents a number of antennas in the remote unit 306(K) (1≤k≤N), wherein q represents expected signal coherency between multiple copies of the downlink MIMO communications signal 316 received by one of the client devices 302 at the location (x,y). In a non-limiting example, q is a positive decimal number between 1 (inclusive) and 2 (inclusive), with 1 representing the least coherency and 2 representing the highest coherency. Notably, the parameters B, $P_s$, $P_n$, r, and q are predetermined and fixed for each execution of the process 400.

Given that the performance-estimation function $f$ ($P_1$-$P_N$) is dependent of the configuration parameter groups $P_1$-$P_N$, a change to any of the configuration parameter groups $P_1$-$P_N$ may result in a significant change in the result of the performance-estimation function $f$ ($P_1$-$P_N$) and consequently the system capacity of the M-MIMO WDS 300. Notably, there exists a vast number of possible combinations of the configuration parameter groups $P_1$-$P_N$. As such, to determine a selected configuration parameter group of the configuration parameter groups $P_1$-$P_N$ that can maximize the system capacity of the M-MIMO WDS 300, it may be necessary to evaluate the vast number of possible combinations of the configuration parameter groups $P_1$-$P_N$. The computer system 500 may be configured via the software instructions stored in the non-transitory computer-readable media 502(1)-502(4) to help determine the selected configuration parameter group of the configuration parameter groups $P_1$-$P_N$ for maximizing the system capacity of the M-MIMO WDS 300. More specifically, the software instructions may be so programmed to iteratively test the performance-estimation function $f$ ($P_1$-$P_N$) based on strategically selected combinations of the configuration parameter groups $P_1$-$P_N$ among the vast number of possible combinations of the configuration parameter groups $P_1$-$P_N$. The performance-estimation function $f$ ($P_1$-$P_N$) may converge quickly (e.g., in one to two minutes for the coverage area 304 of approximately 1200 square meters).

Figure 6:
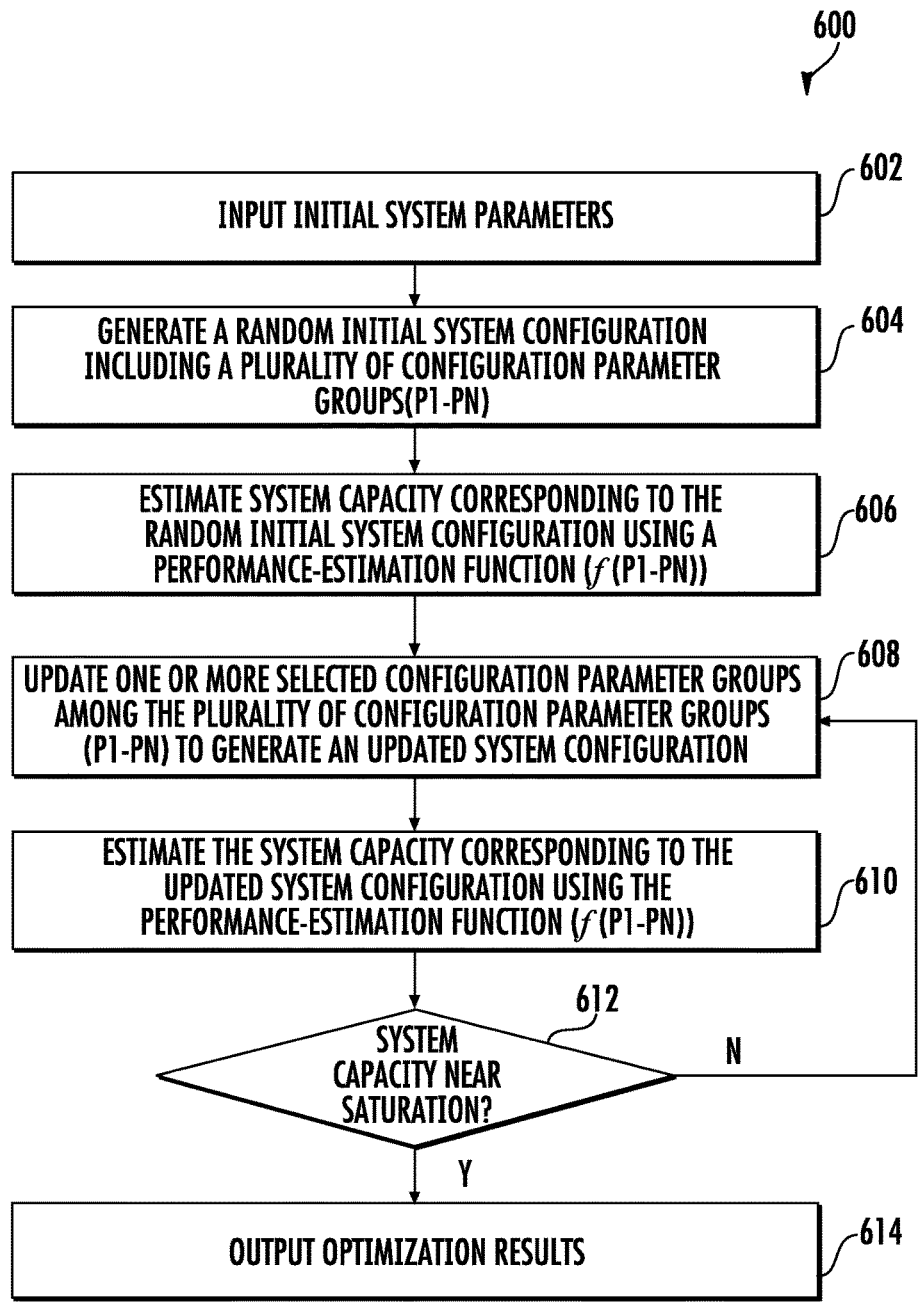
FIG. 6 is flowchart of an exemplary iterative numerical process that can be employed by the computer system of FIG. 5 to iteratively evaluate a performance-estimation function to determine a selected system configuration for maximizing system capacity of the M-MIMO WDS of FIG. 3.

FIG. 6 is flowchart of an exemplary iterative numerical process 600 that can be employed by the computer system 500 of FIG. 5 to iteratively evaluate the performance-estimation function $f$ ($P_1$-$P_N$) of FIG. 4 to determine the selected system configuration for maximizing the system capacity of the M-MIMO WDS 300 of FIG. 3. According to the iterative numerical process 600, one or more initial system parameters (e.g., total number of antennas, total number of remote units, system layout, client device density distribution, and/or coverage area RF survey of the M-MIMO WDS 300) are input into the computer system 500 (block 602). Next, the computer system 500 generates a random initial system configuration including the configuration parameter groups $P_1$-$P_N$ (block 604). Next, the computer system 500 estimates the system capacity corresponding to the random initial system configuration using the performance-estimation function $f$ ($P_1$-$P_N$) (block 606). The computer system 500 may store the system capacity corresponding to the random initial system configuration in a first programmable variable $VAR_1$. Next, the computer system 500 updates one or more selected configuration parameter groups among the configuration parameter groups $P_1$-$P_N$ to generate an updated system configuration (block 608). In a non-limiting example, the selected configuration parameter group can be updated as shown below.

$$x_k^{(i+1)} = x_k^{(i)} + \Delta x \frac{\partial f}{\partial x_k}, \quad y_k^{(i+1)} = y_k^{(i)} + \Delta y \frac{\partial f}{\partial y_k}, \quad n_k^{(i+1)} = n_k^{(i)} + \Delta n \frac{\partial f}{\partial n_k}$$

In the expression above, ($x_k^{(i)}$, $y_k^{(i)}$, $n_k^{(i)}$) are the location and antenna count of remote unit 306(K) (1≤k≤N) of FIG. 3 in an i-th iteration of the iterative numerical process 600. Similarly, ($x_k^{(i+1)}$, $y_k^{(i+1)}$, $n_k^{(i+1)}$) are the updated location and antenna count of the remote unit 306(K) for an (i+1)-th iteration of the iterative numerical process 600. Parameters $\Delta x$, $\Delta y$, $\Delta n$ represent iteration step sizes between the i-th iteration and the (i+1)-th iteration.

The computer system 500 then estimates the system capacity corresponding to the updated system configuration using the performance-estimation function $f$ ($P_1$-$P_N$) (block 610). The computer system 500 may store the system capacity corresponding to the updated system configuration in a second programmable variable $VAR_2$. The computer system 500 then checks to see if the system capacity nears saturation (block 612). In this regard, the computer system 500 may compare the second programmable variable $VAR_2$ against the first programmable variable $VAR_1$ to determine whether the second programmable variable $VAR_2$ is higher than the first programmable variable $VAR_1$.

If the second programmable variable $VAR_2$ is higher than the first programmable variable $VAR_1$ by a predefined threshold, the computer system 500 may conclude that the updated system configuration can lead to a better system capacity. Accordingly, the computer system 500 may copy the second programmable variable $VAR_2$ to the first programmable variable $VAR_1$ and return to block 608 for the next iteration.

If the second programmable variable $VAR_2$ is higher than the first programmable variable $VAR_1$ by less than the predefined threshold, the computer system 500 may conclude that the system capacity has been maximized. Accordingly, the computer system 500 may output the optimization results stored in the second programmable variable $VAR_2$ (block 614). The computer system 500 then concludes the iterative numerical process 600.

However, if the second programmable variable $VAR_2$ is lower than the first programmable variable $VAR_1$, the computer system 500 may conclude that the updated system configuration does not lead to a better system capacity. Accordingly, the computer system 500 may discard the updated system configuration, reset the second programmable variable $VAR_2$ to zero, and return to block 608 for the next iteration.

Using the iterative numerical process 600, it may be possible to quickly determine the selected system configuration including an optimal combination of the configuration parameter groups $P_1$-$P_N$ to maximize the system capacity of the M-MIMO WDS 300. It should be appreciated that the iterative numerical process 600 is not limited to maximizing the system capacity of the M-MIMO WDS 300. By making necessary adjustments to the performance-estimation function $f(P_1\text{-}P_N)$, the iterative numerical process 600 may be used to optimize any selected system performance indicator of the M-MIMO WDS 300.

The M-MIMO WDS 300 of FIG. 3 optimized based on the process 400 of FIG. 4 and/or the iterative numerical process 600 of FIG. 6 can provide higher system capacity over a conventional distributed antenna system (DAS) and the conventional CD-M-MIMO system 214 of FIG. 2B. In this regard, FIGS. 7A and 7B are plots providing an exemplary network capability comparison between the M-MIMO WDS 300 of FIG. 3, the conventional CD-M-MIMO system 214 of FIG. 2B, and a conventional DAS.

Figure 7A:
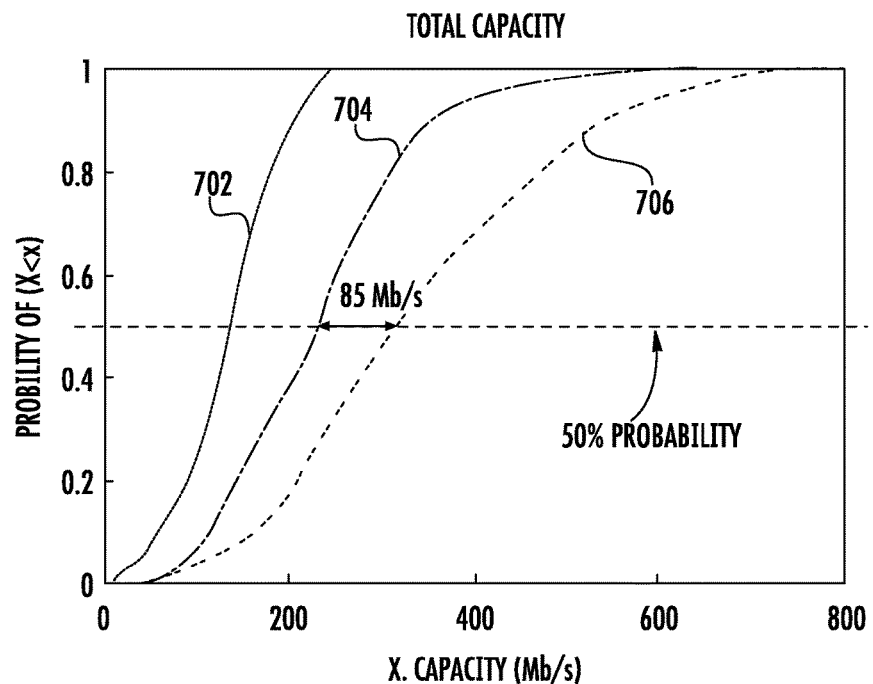
FIGS. 7A and 7B are plots providing an exemplary network capability comparison between the M-MIMO WDS of FIG. 3, the conventional CD-M-MIMO system of FIG. 2B, and a conventional DAS.
Figure 7B:
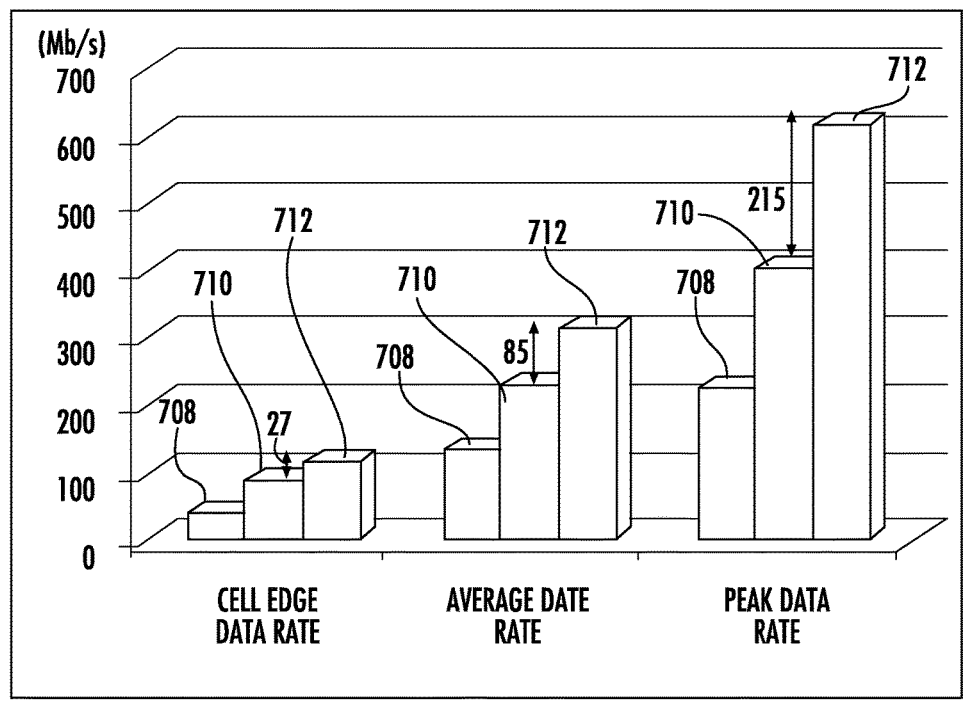

In a non-limiting example, the network capacity comparisons as illustrated in FIGS. 7A and 7B are based on a total of twelve antennas provided in each of the systems. The conventional DAS includes six remote units each having two antennas. The conventional CD-M-MIMO system 214 includes three remote units each having four antennas. The M-MIMO WDS 300 includes three remote units having two, five, and five antennas, respectively. Notably, according to previous discussions with reference to FIG. 3, the two remote units with five antennas are located in remote coverage areas with higher client device densities, while the remote unit with two antennas is located in a remote coverage area with a lower client device density.

FIG. 7A includes a first capacity-probability curve 702, a second capacity-probability curve 704, and a third capacity-probability curve 706. The first capacity-probability curve 702 illustrates a network capability of the conventional DAS at various probabilities. The second capacity-probability curve 704 illustrates a network capability of the conventional CD-M-MIMO system 214 at various probabilities. The third capacity-probability curve 706 illustrates a network capability of the M-MIMO WDS 300 at various probabilities. As shown in FIG. 7A, at fifty percent (50%) probability, the network capacity of the M-MIMO WDS 300 is higher than the network capacity of the conventional CD-M-MIMO system 214 by 85 megabits per second (Mbps).

FIG. 7B includes a first bar graph 708, a second bar graph 710, and a third bar graph 712 corresponding to the conventional DAS, the conventional CD-M-MIMO system 214, and the M-MIMO WDS 300, respectively. FIG. 7B shows that an average cell edge data rate of the M-MIMO WDS 300 is higher than an average cell edge data rate of the conventional CD-M-MIMO system 214 by 27 Mbps. FIG. 7B also shows that an average data rate of the M-MIMO WDS 300 is higher than an average data rate of the conventional CD-M-MIMO system 214 by 85 Mbps. FIG. 7B further shows that an average peak data rate of the M-MIMO WDS 300 is higher than an average peak data rate of the conventional CD-M-MIMO system 214 by 215 Mbps. In summary, the M-MIMO WDS 300 can bring an approximately 37% capacity gain as compared to the conventional CD-M-MIMO system 214. Further, the M-MIMO WDS 300 can bring an approximately 2.3 times higher capacity than the conventional DAS, even with fewer remote units.

Figure 8:
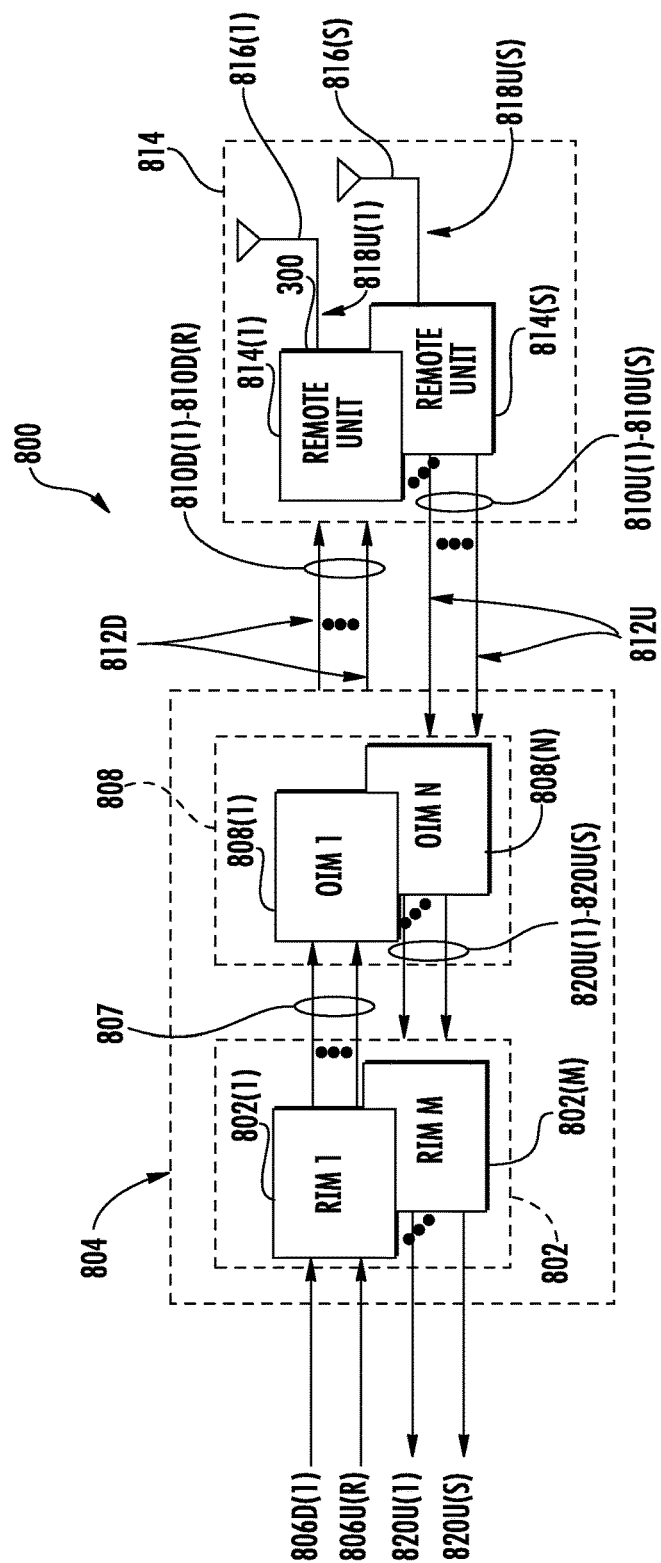
FIG. 8 is a schematic diagram of an exemplary WDS provided in the form of an optical fiber-based WDS that can be configured as the M-MIMO WDS of FIG. 3 to support the plurality of client devices distributed non-uniformly throughout the coverage area of the M-MIMO WDS.

FIG. 8 is a schematic diagram of an exemplary WDS 800 provided in the form of an optical fiber-based WDS that can be configured as the M-MIMO WDS 300 of FIG. 3 to support the client devices 302 distributed non-uniformly throughout the coverage area 304 of the M-MIMO WDS 300. The WDS 800 includes an optical fiber for distributing communications services for multiple frequency bands. The WDS 800 in this example is comprised of three main components. A plurality of radio interfaces provided in the form of radio interface modules (RIMs) 802(1)-802(M) are provided in a central unit 804 to receive and process one or more downlink communications signals 806D(1)-806D(R) prior to optical conversion into downlink optical fiber-based communications signals. The downlink communications signals 806D(1)-806D(R) may be received from a base station as an example. The RIMs 802(1)-802(M) provide both downlink and uplink interfaces for signal processing. The notations "1-R" and "1-M" indicate that any number of the referenced component, 1-R and 1-M, respectively, may be provided. The central unit 804 is configured to accept the RIMs 802(1)-802(M) as modular components that can easily be installed and removed or replaced in the central unit 804. In one example, the central unit 804 is configured to support up to twelve RIMs 802(1)-802(12). Each of the RIMs 802(1)-802(M) can be designed to support a particular type of radio source or range of radio sources (i.e., frequencies) to provide flexibility in configuring the central unit 804 and the WDS 800 to support the desired radio sources.

For example, one RIM 802 may be configured to support the Personalized Communications System (PCS) radio band. Another RIM 802 may be configured to support the 800 MHz radio band. In this example, by inclusion of the RIMs 802(1)-802(M), the central unit 804 could be configured to support and distribute communications signals on both PCS and Long-Term Evolution (LTE) 700 radio bands, as an example. The RIMs 802(1)-802(M) may be provided in the central unit 804 that support any frequency bands desired, including, but not limited to, the US Cellular band, PCS band, Advanced Wireless Service (AWS) band, 700 MHz band, Global System for Mobile communications (GSM) 900, GSM 1800, and Universal Mobile Telecommunications System (UMTS). The RIMs 802(1)-802(M) may also be provided in the central unit 804 that support any wireless technologies desired, including, but not limited to, Code Division Multiple Access (CDMA), CDMA200, 1×RTT, Evolution-Data Only (EV-DO), UMTS, High-speed Packet Access (HSPA), GSM, General Packet Radio Services (GPRS), Enhanced Data GSM Environment (EDGE), Time Division Multiple Access (TDMA), LTE, iDEN, and Cellular Digital Packet Data (CDPD).

The RIMs 802(1)-802(M) may be provided in the central unit 804 that support any frequencies desired, including, but not limited to, US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 8, the central unit 804 may convert the downlink communications signals 806D(1)-806D(R) into a downlink MIMO communications signal 807 and provide the downlink MIMO communications signal 807 to a plurality of optical interfaces provided in the form of optical interface modules (OIMs) 808(1)-808(N) in this embodiment to convert the downlink MIMO communications signal 807 into a plurality of downlink optical fiber-based MIMO communications signals 810D(1)-810D(R). The notation "1-N" indicates that any number of the referenced component 1-N may be provided. The OIMs 808(1)-808(N) may be configured to provide a plurality of optical interface components (OICs) that contain optical-to-electrical (O/E) and electrical-to-optical (E/O) converters, as will be described in more detail below. The OIMs 808(1)-808(N) support the radio bands that can be provided by the RIMs 802(1)-802(M), including the examples previously described above.

The OIMs 808(1)-808(N) each include E/O converters to convert the downlink MIMO communications signal 807 into the downlink optical fiber-based MIMO communications signals 810D(1)-810D(R). The downlink optical fiber-based MIMO communications signals 810D(1)-810D(R) are communicated over a downlink optical fiber-based communications medium 812D to a plurality of remote units 814(1)-814(S). The remote units 814(1)-814(S) may be configured and deployed based on the selected system configuration determined via the process 400 of FIG. 4 to maximize the selected system performance indicator (e.g., network capacity). The notation "1-S" indicates that any number of the referenced component 1-S may be provided. Remote unit O/E converters provided in the remote units 814(1)-814(S) convert the downlink optical fiber-based MIMO communications signals 810D(1)-810D(R) back into the downlink MIMO communications signal 807. The downlink MIMO communications signal 807 is provided to antennas 816(1)-816(S) in the remote units 814(1)-814(S) to client devices in the reception range of the antennas 816(1)-816(S).

The remote units 814(1)-814(S) receive a plurality of uplink communications signals from the client devices through the antennas 816(1)-816(S). Remote unit E/O converters are also provided in the remote units 814(1)-814(S) to convert the uplink communications signals 818U(1)-818U(S) into a plurality of uplink optical fiber-based communications signals 810U(1)-810U(S). The remote units 814(1)-814(S) communicate the uplink optical fiber-based communications signals 810U(1)-810U(S) over an uplink optical fiber-based communications medium 812U to the OIMs 808(1)-808(N) in the central unit 804. The OIMs 808(1)-808(N) include O/E converters that convert the received uplink optical fiber-based communications signals 810U(1)-810U(S) into a plurality of uplink communications signals 820U(1)-820U(S), which are processed by the RIMs 802(1)-802(M) and provided as the uplink communications signals 820U(1)-820U(S). The central unit 804 may provide the uplink communications signals 820U(1)-820U(S) to a base station or other communications system.

Note that the downlink optical fiber-based communications medium 812D and the uplink optical fiber-based communications medium 812U connected to each of the remote units 814(1)-814(S) may be a common optical fiber-based communications medium, wherein for example, wave division multiplexing (WDM) is employed to provide the downlink optical fiber-based MIMO communications signals 810D(1)-810D(R) and the uplink optical fiber-based communications signals 810U(1)-810U(S) on the same optical fiber-based communications medium.

Figure 9:
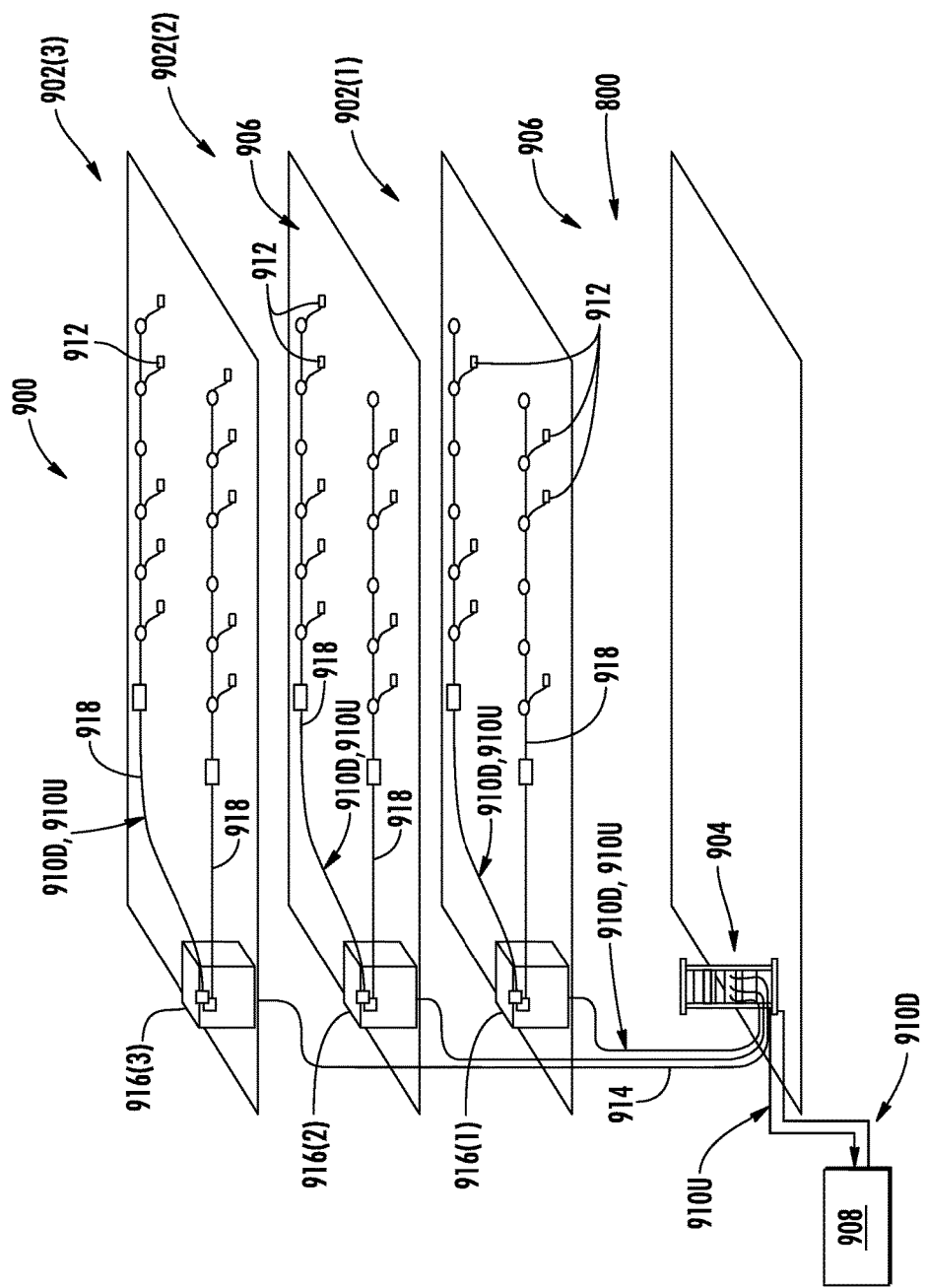
FIG. 9 is a partial schematic cut-away diagram of an exemplary building infrastructure in which a WDS, such as the WDS of FIG. 8, including a plurality of remote units configured and deployed based on a selected system configuration determined via the process of FIG. 4 to maximize a selected system performance indicator (e.g., network capacity) of the WDS.

The WDS 800 of FIG. 8 may be provided in an indoor environment, as illustrated in FIG. 9. FIG. 9 is a partial schematic cut-away diagram of an exemplary building infrastructure 900 in which a WDS, such as the WDS 800 of FIG. 8, including a plurality of remote units configured and deployed based on the selected system configuration determined via the process 400 of FIG. 4 to maximize the selected system performance indicator (e.g., network capacity) of the WDS 800. The building infrastructure 900 in this embodiment includes a first (ground) floor 902(1), a second floor 902(2), and a third floor 902(3). The floors 902(1)-902(3) are serviced by a central unit 904 to provide antenna coverage areas 906 in the building infrastructure 900. The central unit 904 is communicatively coupled to a base station 908 to receive downlink communications signals 910D from the base station 908. The central unit 904 is communicatively coupled to a plurality of remote units 912 to distribute the downlink communications signals 910D to the remote units 912 and to receive uplink communications signals 910U from the remote units 912, as previously discussed above. The downlink communications signals 910D and the uplink communications signals 910U communicated between the central unit 904 and the remote units 912 are carried over a riser cable 914. The riser cable 914 may be routed through interconnect units (ICUs) 916(1)-916(3) dedicated to each of the floors 902(1)-902(3) that route the downlink communications signals 910D and the uplink communications signals 910U to the remote units 912 and also provide power to the remote units 912 via array cables 918.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method for optimizing a selected performance indication of a massive multiple-input multiple-output (M-MIMO) wireless distribution system (WDS), comprising:

generating an initial system configuration based on at least one initial system parameter of a M-MIMO WDS, wherein the initial system configuration comprises a plurality of configuration parameter groups corresponding to a plurality of remote units in the M-MIMO WDS, respectively;

providing the plurality of configuration parameter groups to a performance-estimation function configured to estimate a selected system performance indicator of the M-MIMO WDS based on the plurality of configuration parameter groups;

generating an initial estimation of the selected system performance indicator by the performance-estimation function according to the initial system configuration;

updating one or more selected configuration parameter groups among the plurality of configuration parameter groups to generate at least one updated system configuration;

providing the plurality of configuration parameter groups comprising the one or more selected configuration parameter groups to the performance-estimation function;

generating at least one updated estimation of the selected system performance indicator by the performance-estimation function according to the at least one updated system configuration;

determining a selected system configuration between the initial system configuration and the at least one updated system configuration corresponding to a higher selected system performance indicator among the initial estimation of the selected system performance indicator and the at least one updated estimation of the selected system performance indicator; and configuring the plurality of remote units based on the selected system configuration.

2. The method of claim 1, further comprising outputting the selected system configuration for configuring the plurality of remote units based on the selected system configuration.

3. The method of claim 1, further comprising:

providing the plurality of configuration parameter groups to the performance-estimation function configured to estimate a system capacity of the M-MIMO WDS based on the plurality of configuration parameter groups;

estimating an initial system capacity for the initial system configuration by the performance-estimation function;

updating the one or more selected configuration parameter groups among the plurality of configuration parameter groups to generate the at least one updated system configuration;

providing the plurality of configuration parameter groups comprising the one or more selected configuration parameter groups to the performance-estimation function;

estimating at least one updated system capacity for the at least one updated system configuration by the performance-estimation function;

determining the selected system configuration between the initial system configuration and the at least one updated system configuration corresponding to a higher system capacity among the initial system capacity and the at least one updated system capacity; and configuring the plurality of remote units based on the selected system configuration.

4. The method of claim 3, further comprising outputting the selected system configuration for configuring the plurality of remote units based on the selected system configuration.

5. The method of claim 1, wherein the at least one initial system parameter comprises one or more system parameters selected from the group consisting of: total number of antennas; total number of remote units; system layout; client device density distribution; and coverage area radio frequency (RF) survey.

6. The method of claim 1, wherein each of the plurality of configuration parameter groups comprises:

location coordinates of a corresponding remote unit among the plurality of remote units; and a number of antennas to be provided in the corresponding remote unit among the plurality of remote units.

7. The method of claim 1, wherein the performance-estimation function is proportionally related to a weighting function representing one or more spatial dependent parameters selected from the group consisting of: system layout information; client device density distribution; and signal propagation environment.

8. A non-transitory computer-readable medium comprising software with instructions configured to:

generate an initial system configuration based on at least one initial system parameter of a massive multiple-input multiple-output (M-MIMO) wireless distribution system (WDS), wherein the initial system configuration comprises a plurality of configuration parameter groups corresponding to a plurality of remote units in the M-MIMO WDS, respectively;

provide the plurality of configuration parameter groups to a performance-estimation function configured to estimate a selected system performance indicator of the M-MIMO WDS based on the plurality of configuration parameter groups;

generate an initial estimation of the selected system performance indicator by the performance-estimation function according to the initial system configuration;

update one or more selected configuration parameter groups among the plurality of configuration parameter groups to generate at least one updated system configuration;

provide the plurality of configuration parameter groups comprising the one or more selected configuration parameter groups to the performance-estimation function;

generate at least one updated estimation of the selected system performance indicator by the performance-estimation function according to the at least one updated system configuration; and determine a selected system configuration between the initial system configuration and the at least one updated system configuration corresponding to a higher selected system performance indicator among the initial estimation of the selected system performance indicator and the at least one updated estimation of the selected system performance indicator.

9. The non-transitory computer-readable medium of claim 8, wherein the instructions are further configured to output the selected system configuration for configuring the plurality of remote units based on the selected system configuration.

10. The non-transitory computer-readable medium of claim 8, wherein the instructions are further configured to:

provide the plurality of configuration parameter groups to the performance-estimation function configured to estimate a system capacity of the M-MIMO WDS based on the plurality of configuration parameter groups;

estimate an initial system capacity for the initial system configuration by the performance-estimation function;

update the one or more selected configuration parameter groups among the plurality of configuration parameter groups to generate the at least one updated system configuration;

provide the plurality of configuration parameter groups comprising the one or more selected configuration parameter groups to the performance-estimation function;

estimate at least one updated system capacity for the at least one updated system configuration by the performance-estimation function; and determine the selected system configuration between the initial system configuration and the at least one updated system configuration corresponding to a higher system capacity among the initial system capacity and the at least one updated system capacity.

11. The non-transitory computer-readable medium of claim 10, further comprising outputting the selected system configuration for configuring the plurality of remote units based on the selected system configuration.

12. The non-transitory computer-readable medium of claim 8, wherein the at least one initial system parameter comprises one or more system parameters selected from the group consisting of: total number of antennas; total number of remote units; system layout; client device density distribution; and coverage area radio frequency (RF) survey.

13. The non-transitory computer-readable medium of claim 8, wherein each of the plurality of configuration parameter groups comprises:

location coordinates of a corresponding remote unit among the plurality of remote units; and number of antennas to be provided in the corresponding remote unit among the plurality of remote units.

14. The non-transitory computer-readable medium of claim 8, wherein the performance-estimation function is proportionally related to a weighting function representing one or more spatial dependent parameters selected from the group consisting of: system layout information; client device density distribution; and signal propagation environment.

* * * * *